(12) United States Patent
Kurtin

(10) Patent No.: US 7,102,079 B1
(45) Date of Patent: Sep. 5, 2006

(54) ELECTRICAL WIRE AND CABLE PROTECTION AND RETRIEVAL SYSTEM

(76) Inventor: Ken Kurtin, 403 Delles Rd., Wheaton, IL (US) 60187

( * ) Notice: Subject to any disclaimer, the term of this patent is extended or adjusted under 35 U.S.C. 154(b) by 0 days.

(21) Appl. No.: 11/061,814

(22) Filed: Feb. 22, 2005

(51) Int. Cl.
*H01H 9/02* (2006.01)

(52) U.S. Cl. ............................ 174/58; 174/60; 174/62; 174/135; 220/4.02; 248/906

(58) Field of Classification Search ................ 174/58, 174/60, 135, 62, 50; 220/3.2, 3.7, 3.9, 4.02; 248/906; 439/535
See application file for complete search history.

(56) References Cited

U.S. PATENT DOCUMENTS

| | | | | |
|---|---|---|---|---|
| 5,109,316 | A * | 4/1992 | Murphy | 361/643 |
| 5,448,011 | A * | 9/1995 | Laughlin | 174/48 |
| 6,103,974 | A * | 8/2000 | Erdfarb | 174/66 |
| 6,615,522 | B1 * | 9/2003 | Weis | 40/594 |
| 6,768,055 | B1 * | 7/2004 | Gorin | 174/50 |
| 6,806,425 | B1 * | 10/2004 | O'Neill | 174/66 |

* cited by examiner

*Primary Examiner*—Dhiru R. Patel
(74) *Attorney, Agent, or Firm*—Gregory B. Beggs

(57) ABSTRACT

An assembly is disclosed for finding and withdrawing wire and cable ends from locations inside a wall which is being constructed where they have been temporarily brought. The assembly includes a plaster ring fastened to a wall stud. A plaster ring cover plate is temporarily attached to the plaster ring. A hitch is provided on the plaster ring cover plate for joining the wire or cable ends to the cover plate. A tying member may be used to tie the wire or cable end to the cover plate if desired. A method for retrieving the wire and cable ends is also disclosed which includes placing a plaster ring near a location where the wire or cable ends are brought, providing a plaster ring cover plate which is removably engaged on the plaster ring with a hitch for receiving the wire or cable end, engaging the wire or cable end on the hitch, and engaging the plaster ring cover plate on the plaster ring. When the plaster ring cover plate is pulled off of the plaster ring, the wire or cable ends attached to the cover plate are drawn with the cover plate and out of the wall.

18 Claims, 6 Drawing Sheets

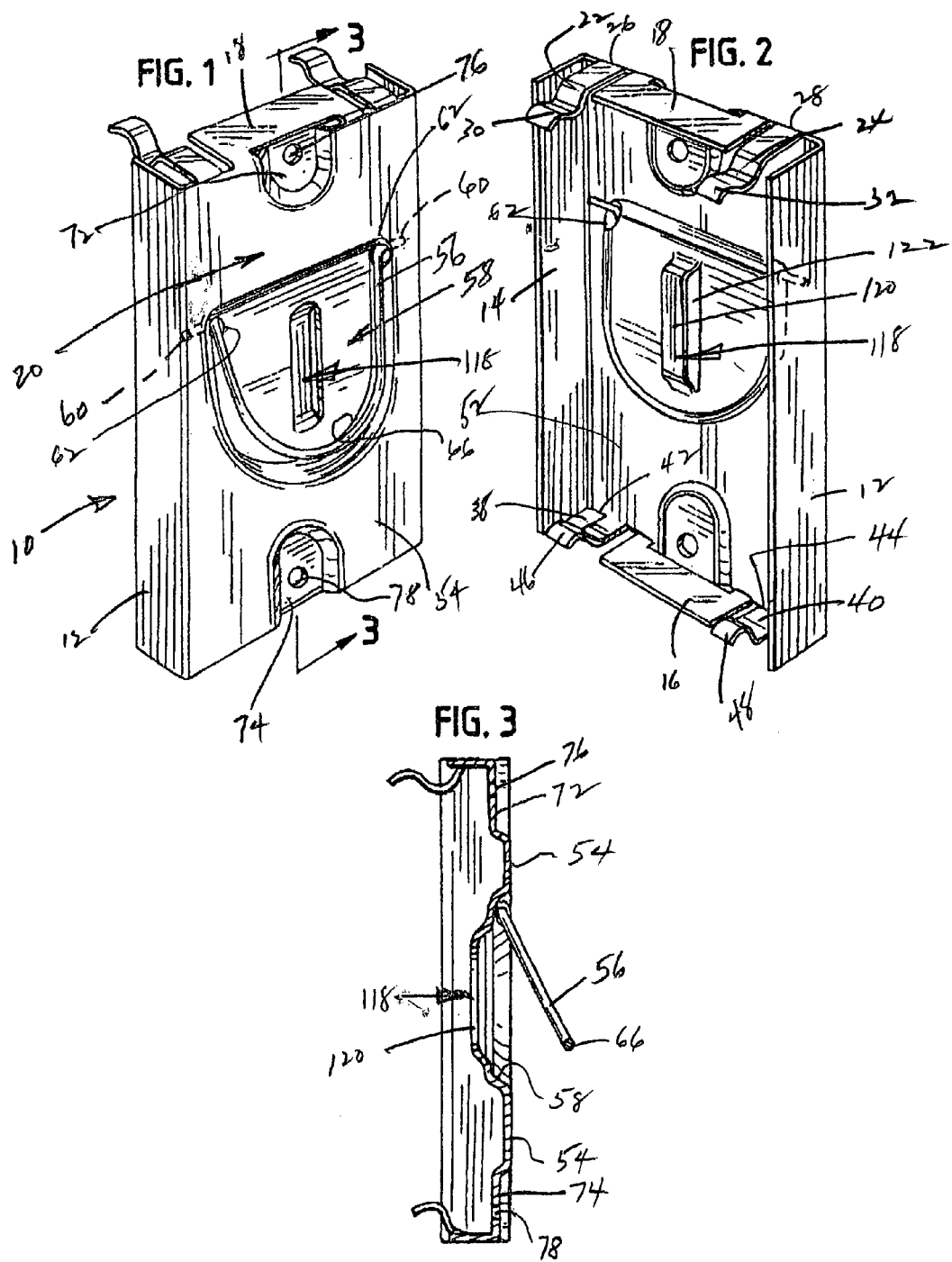

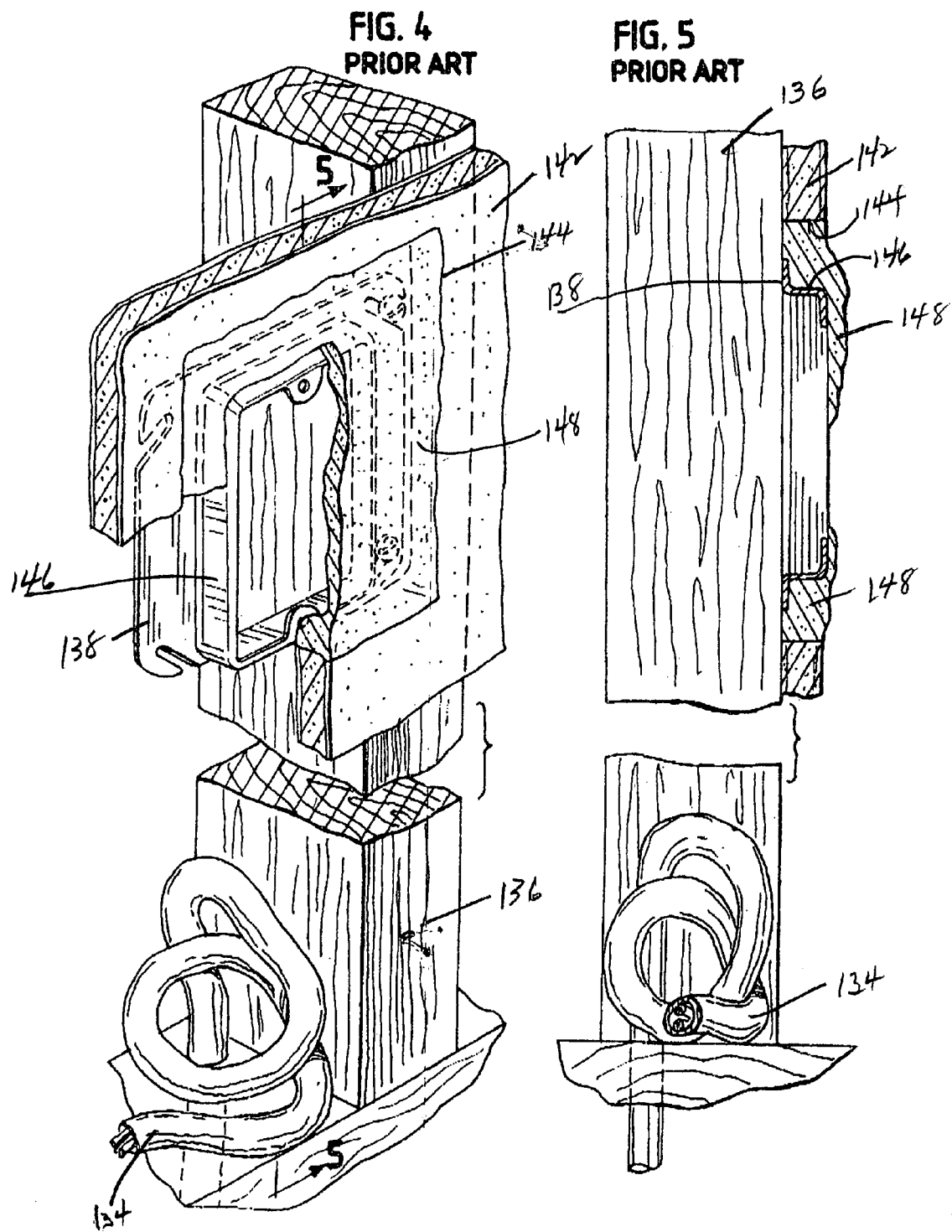

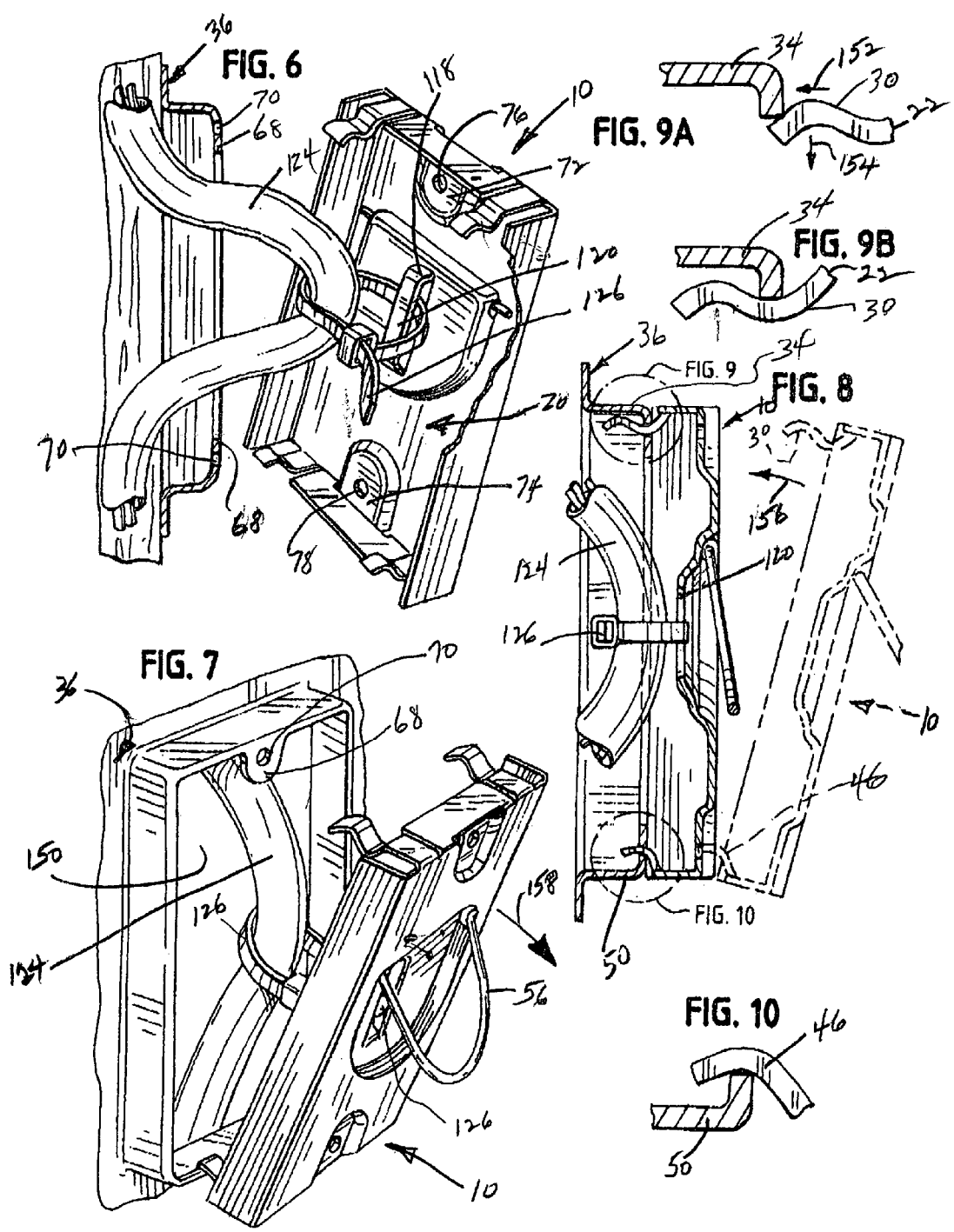

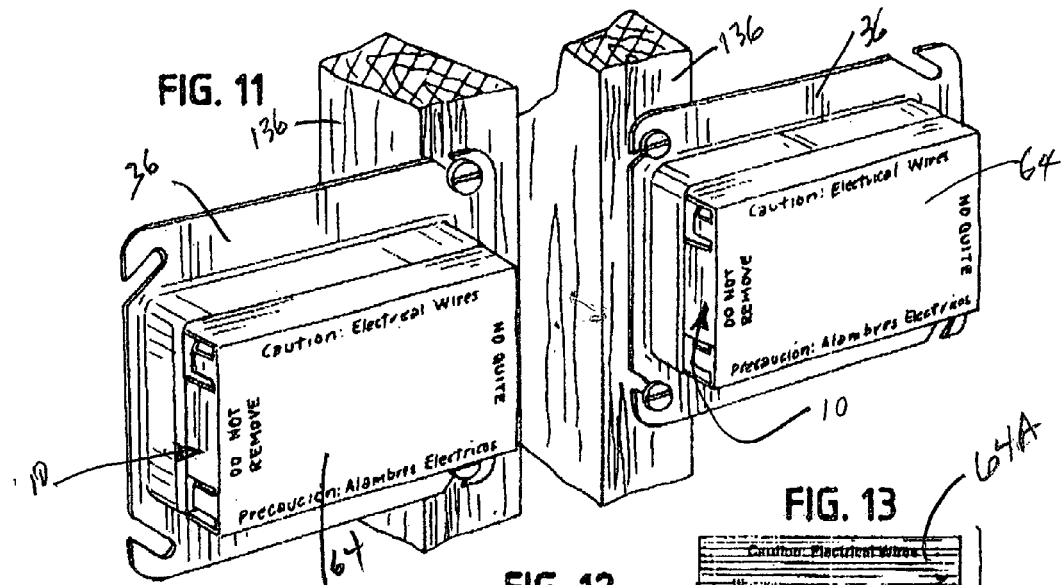
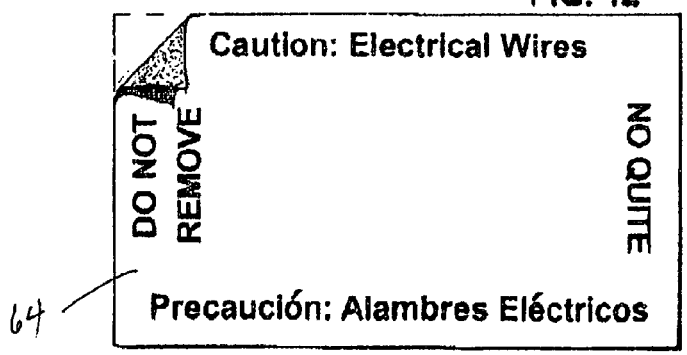
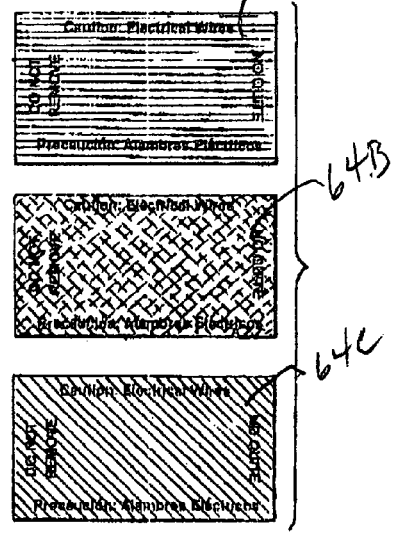
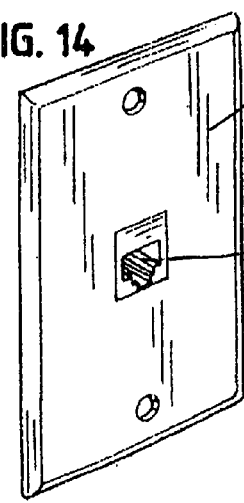
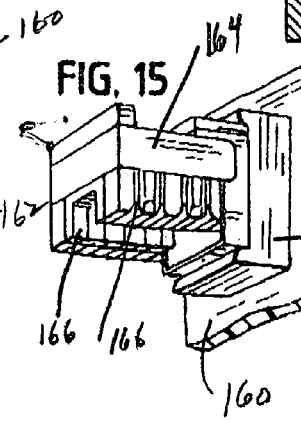
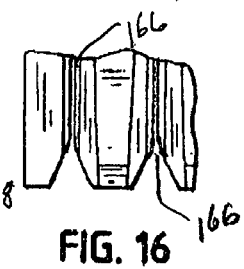

ELECTRICAL WIRE AND CABLE PROTECTION AND RETRIEVAL SYSTEM

This invention relates to assemblies for locating and withdrawing electrical wire and cable ends from places where they have been brought during the preliminary construction of a wall before the studs in the wall are covered. More particularly, it relates to a combination of a plaster ring and a plaster ring cover plate which remain clipped together until the wall has been finished; thereafter, the location of a wall fixture, such as an outlet, switch, telephone jack or the like, may be quickly located and identified by the plaster ring cover plate. A wire or cable end within the wall, previously tied to the plate, may be withdrawn from the wall without damage to the wire or cable, or the wall, through the central aperture of the plaster ring by pulling the plaster ring cover plate off the plaster ring and drawing the wire or cable end with it.

BACKGROUND OF THE INVENTION

The wire protecting ring described in U.S. Pat. No. 6,608,252 addresses a related problem, namely, protecting electrical wire ends in a junction box during the construction of a wall. That patent recognizes the need for protecting the wire ends inside the wall while the surface members of the wall are being installed, namely, in this case, the wallboards. The patent discloses a ring which can be installed over an outlet box to identify the location of the box for the person who installs the wallboard sheets. The ring is intended to protect the wire ends inside the box as a portion of the sheet over the box is cut away and removed. A panel in the center of the ring over the wire ends closes a central aperture in the ring so that the cutting tool which the wallboard installer uses will not damage the wires. The panel is connected to the frame portion of the ring with links which may be broken, and the panel thereafter removed, so that an electrician can get through the wallboard to the interior of the box and grasp the wire ends in order to pull them out and affix them to a switch or other fixture on the roomside surface of the wallboard.

Generally similar protective plates are illustrated in U.S. Pat. Nos. 6,166,329; 6,479,749; and 6,462,278. And in U.S. Pat. No. 6,403,883 a protective plate which is nested into an electrical utility box utilizes a spike which points outwardly from the plate and pierces any covering put over the box in order to identify where the box is.

While these assemblies protect wires which have been brought into the utility boxes, none of them deal with what occurs when a wallboard finisher closes the gaps between the rough cut edges of the wallboard around the box and the edges of the box itself with drywall compound. Oftentimes the compound is inadvertently spread over the edges of the cover plate, making it difficult to find and hard to retrieve any wiring inside the box. Moreover, none of these patents deal with an installation in which a utility box is not used, i.e., when the wire or cable ends are simply left inside the wall to be extracted later, assuming that they can be found, through a nondescript hole in the wallboard left by the previous workman, often without identification of the type of wiring or the type of fixture to be connected.

The present invention solves these and other wire and cable end retrieval problems. It provides means for quickly identifying the type of electrical installation to be placed at a particular location. And it provides means for quickly withdrawing the wire or cable ends from the wall, whether they are in a utility box or not, and eliminates having the ends covered with dried joint compound.

SUMMARY OF THE INVENTION

An electrical conductor retrieval assembly is disclosed for finding and withdrawing wire and cable ends from places where they have been brought temporarily inside a wall construction. The assembly includes a wall stud and a plaster ring fastened to the stud. Opposed edge portions of the plaster ring define an opening through the ring from inside the wall. A plaster ring cover plate is also included which is temporarily and removably engaged on the edge portions of the plaster ring. A hitch on the plaster ring cover plate provides a connection for the wire or cable end to the cover plate. A bail or similar plate removal member may be attached to the plaster ring cover plate for pulling it off the plaster ring and drawing the wire or cable ends attached to the hitch out of the wall through the plaster ring.

From the foregoing, and from what follows, it will be apparent that the present invention solves the problems of finding the cover plate, removing it from the wall easily, identifying the type of fixture for the location, pulling the wire or cable out of the wall readily and accessing it quickly by a simple disconnect from the plaster ring cover plate.

Accordingly, it is one of the objects of this invention to provide an electrical conductor retrieval assembly for pulling a wire or cable end out of a wall readily by connecting it to a plaster ring cover plate before the finishing members of the wall are installed.

It is another object of this invention to provide a cover plate for withdrawing a wire or cable end from inside a wall which is readily accessible despite excessive and indiscriminate applications of joint compound or other plastering compounds around the plaster ring on which the cover plate is mounted.

It is another object of this invention to provide a cover plate for withdrawing a wire or cable end from inside a wall which affords an easy identification to an electrical fixture installer of the type of wiring at a particular location and of the intended fixture.

It is another object of this invention to provide a cover plate for withdrawing a wire or cable end from inside a wall which utilizes a rapid disconnection of the wire or cable from the cover plate once the wire or cable is pulled out of the wall.

Other objects and features of this invention will be apparent to those skilled in the art of designing, constructing and using plaster rings in wall constructions from an examination of the following detailed description of a preferred embodiment of this invention as well as an examination of the accompanying drawings.

BRIEF DESCRIPTION OF THE DRAWINGS

FIG. 1 is a perspective view of the front face of a plaster ring cover plate embodying the present invention;

FIG. 2 is a perspective view of the rear face of the plaster ring cover plate shown in FIG. 1;

FIG. 3 is a sectional view of the plaster ring cover plate shown in FIG. 1, taken along line 3—3 in FIG. 1;

FIG. 4 is a perspective view, partly broken away, of a prior art wall construction showing a plaster ring and a nearby cable end;

FIG. 5 is a sectional view of the prior art wall construction shown in FIG. 4, taken along the line 5—5 in FIG. 4;

FIG. 6 is a perspective view, partly broken away, of the plaster ring cover plate shown in FIG. 1 with the end of a cable tied to it preparatory to being assembled onto a plaster ring;

FIG. 7 is a perspective view, partly broken away, of the plaster ring cover plate shown in FIG. 6 with the end of a cable tied to it being pulled away from the plaster ring shown in FIG. 6;

FIG. 8 is a sectional view, in perspective and partly broken away, of the plaster ring cover plate shown in FIG. 1 assembled on a plaster ring and showing the plaster ring cover plate's preassembly position in phantom;

FIG. 9A is an enlarged view of a pre-assembly position of parts of the plaster ring cover plate and plaster ring shown in the circle labeled FIG. 9 in FIG. 8;

FIG. 9B is an enlarged view of parts of the plaster ring cover plate and plaster ring shown in the circle labeled FIG. 9 in FIG. 8 in assembled position;

FIG. 10 is an enlarged view of assembled parts of the plaster ring cover plate and plaster ring shown in the circle labeled FIG. 10 in FIG. 8;

FIG. 11 is a perspective view partly broken away of a pair of assembled plaster ring cover plates and plaster rings mounted on wall studs and having identification labels adhesively attached to the front faces of the plaster ring cover plates;

FIG. 12 is an enlarged plan view of the label shown in FIG. 11;

FIG. 13 is a view of several labels coded with different colors which may be used on the plaster ring cover plates shown in FIG. 11;

FIG. 14 is a perspective view of a fixture plate for an electrical connection on the room side of a wall showing the end of an electrical cable connector fastened into and protruding through an opening in the fixture plate;

FIG. 15 is an enlarged perspective view of a portion of the rear side of the fixture plate of FIG. 14 showing attachment of the electrical cable connector to the fixture plate;

FIG. 16 is an enlarged portion of the electrical cable connector of FIG. 15 illustrating the openings in the connector for receiving a plurality of conductor wire ends from the cable;

DESCRIPTION OF THE PREFERRED EMBODIMENTS

Figure 17:
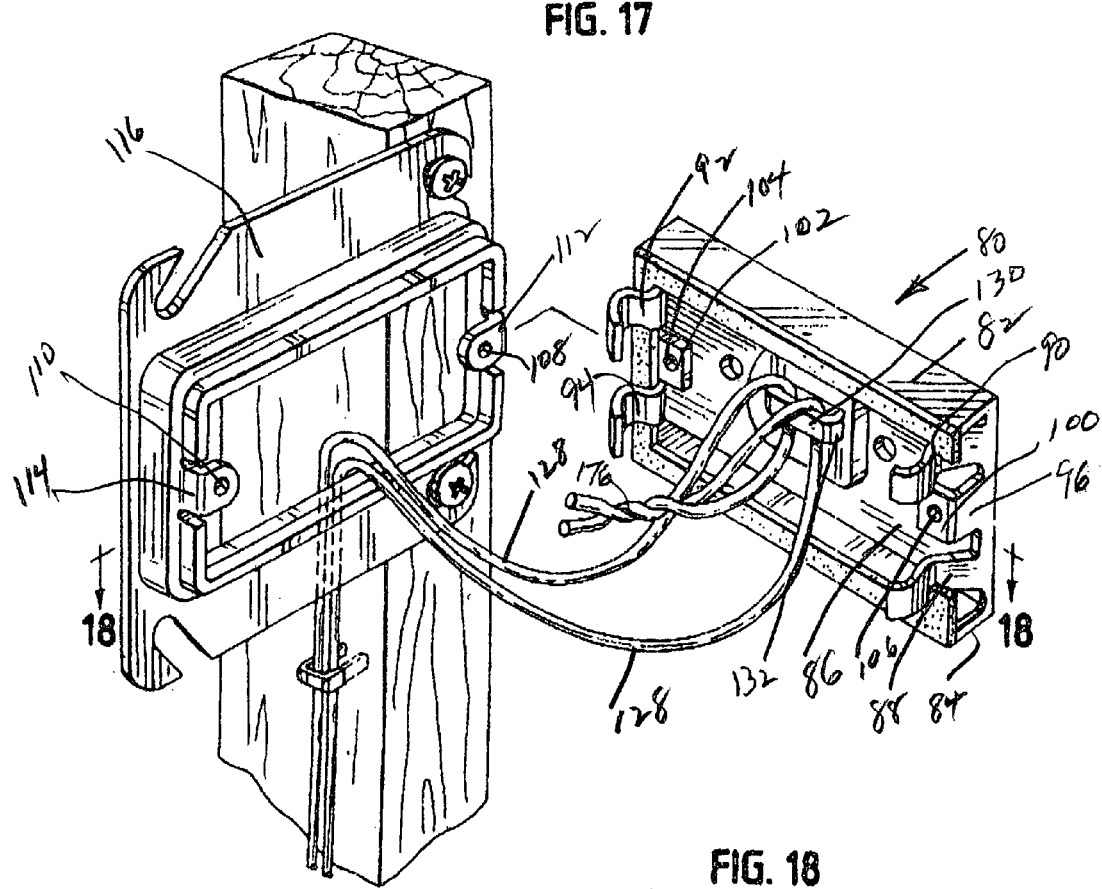
FIG. 17 is an alternative form of plaster ring and plaster ring cover plate assembly embodying the present invention showing low voltage electrical wires tied to the plaster ring cover plate.

A plaster ring cover plate 10 is shown by itself in FIGS. 1–3. Riser edge portions 12, 14, 16 and 18 incorporate a height dimension into the plate, and planar member 20 spans the top of the plate, normally extending to at least two of the riser edge portions 12, 14, 16 and 18. Spring arms 22 and 24, fastened at their base ends 26 and 28, respectively, to top planar member 20, include curved distal ends 30 and 32 which slidably snap onto and temporarily grasp an edge portion 34 of a plaster ring 36 (See FIGS. 8, 9A and 9B). Similar spring arms 38 and 40 are fastened at their base ends 42 and 44, respectively, to the planar member 20 and have curved distal ends 46 and 48, respectively, which slidably clip over and temporarily grasp a second edge portion 50 of plaster ring 36 (See FIGS. 8 and 10). The spring arms 22 and 24, and 38 and 40, thus temporarily engage and grasp the plaster ring and hold the plaster ring cover plate clipped onto the plaster ring.

The planar member 20 has a rear face 52 arranged to confront the interior of the wall and a front face 54 arranged to face away from the wall construction. A removal member such as bail 56 is disposed on the planar member 20 and may be engaged in a recess such as 58 on the front face 54 of planar member 20 by inserting bent ends 60 of the bail into sockets 62 inside the recess 58. When so engaged, the bail 56 may be laid flat within the recess 58 to permit at least a substantial portion of the front face 54 to form a receiving portion of the planar member 20 on which a label 64 (See FIGS. 11, 12 and 13) may be adhesively placed facing away from the interior of the wall. Later, when the label 64 is removed, bail 56 may be easily grasped. A yoke portion 66 of the bail may be lifted from recess 58, as shown in FIG. 3, and provide a means for gripping the bail and pulling it in order to pull the cover plate 10 against the spring bias of arms 22 and 24 of the plaster ring 36.

Whenever the plaster ring cover plate 10 is intended to be temporarily attached to a plaster ring having mounting tabs, such as the tabs 68 which include screw engagement holes 70 (See FIG. 7), the planar member 20 may be provided with recessed front face portions 72 and 74 having apertures 76 and 78, respectively. The apertures 76 and 78 are in registration with the screw engagement holes 70 in tabs 68 so that screws (not shown) may be inserted into the registered apertures and temporarily hold the plaster ring cover plate onto the plaster ring. The recessed front face portions 72 and 74 maintain a level flat surface on the front face 54 of the planar member for receiving a label 64.

Alternatively, a plaster ring cover plate 80 (See FIGS. 17, 18) which includes riser edge portions 82 and 84 and a planar member 86, as well as spring arms 88, 90, 92 and 94, may be provided with legs, such as legs 96 and 98 having feet 100 and 102. The feet include apertures 104 and 106 which register with apertures 110 and 108 in tabs 114 and 112, respectively, on a plaster ring 116. Screws (not shown) may be inserted into the registered apertures 104, 108 or 106, 110 to further secure the plaster ring cover plate 80 to the plaster ring 116.

The planar member 20 in the plaster ring cover plate 10 is provided with a hitch 118 which has a wire or cable engagement portion 120. The end of an electrical wire or cable 124 may be fastened to the engagement portion 120 of hitch 118 and be held there adjacent the planar member 20. Engagement portion 120 preferably is a strip of the material forming the planar member 20 stretched and pressed inwardly toward the interior of an anticipated wall construction and leaving an aperture 122 through the planar member from the rear face 52 of the planar member to the front face 54. The aperture 122 exposes engagement portion 120 of the hitch 118 so that the engagement portion is accessible from the front face 54 of the planar member. The end of wire or cable 124 (See FIG. 6) may be connected to the plate 10 by fastening it to the engagement portion 120 with a plastic tie 126, although other means for fastening the wire or cable to the hitch may be used. For example, the engagement portion 120 may be designed as a clip or hook (not shown).

Figure 18:
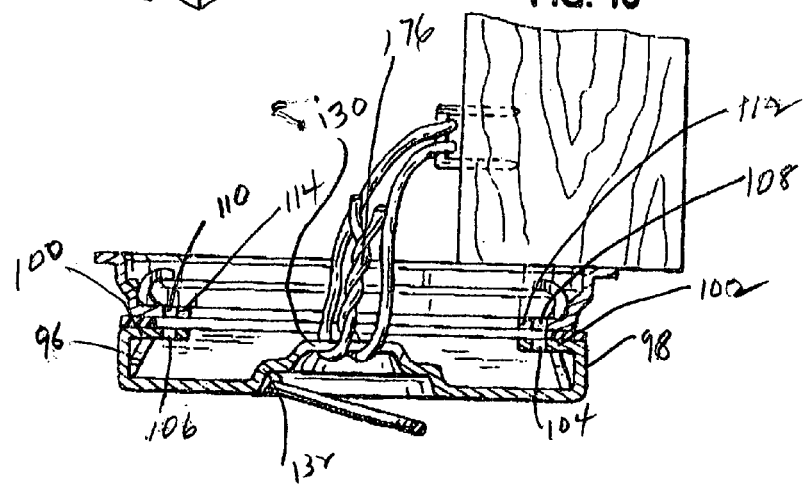
FIG. 18 is a sectional view of the assembly shown in FIG. 17, taken along the line 18—18 in FIG. 17, and showing the plaster ring cover plate being snapped into place on the plaster ring.
Figure 19:
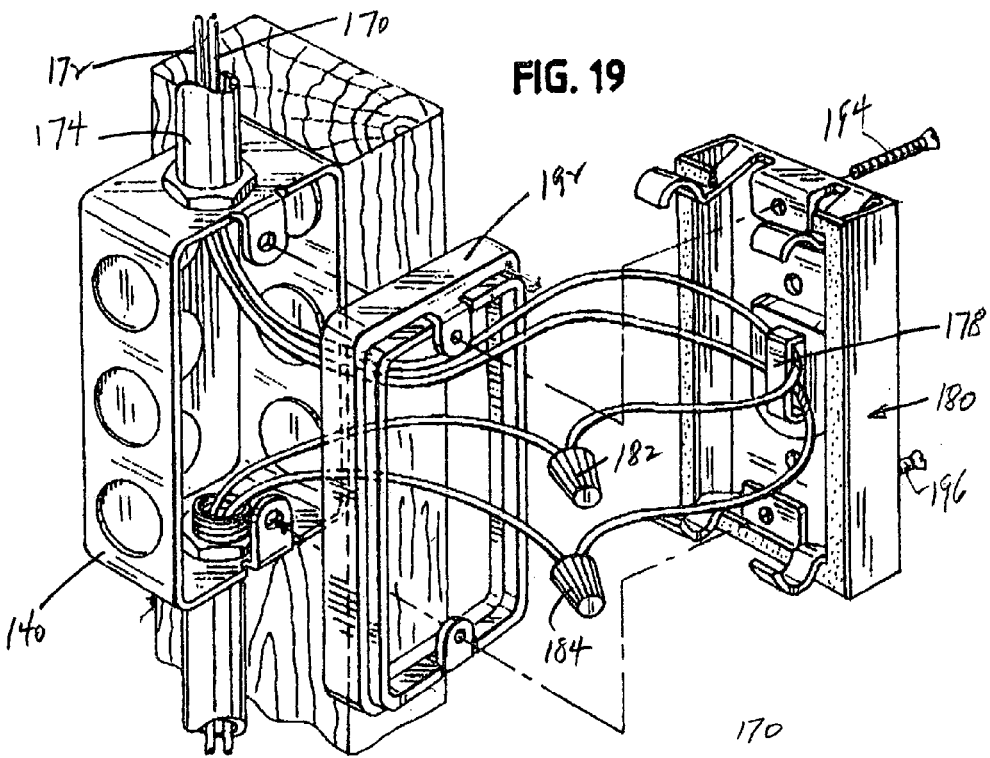
FIG. 19 is an exploded view of a plaster ring and plaster ring cover plate embodying the present invention with low voltage wires engaged on the plaster ring cover plate which is arranged to be mounted onto a junction box in a wall.
Figure 21:
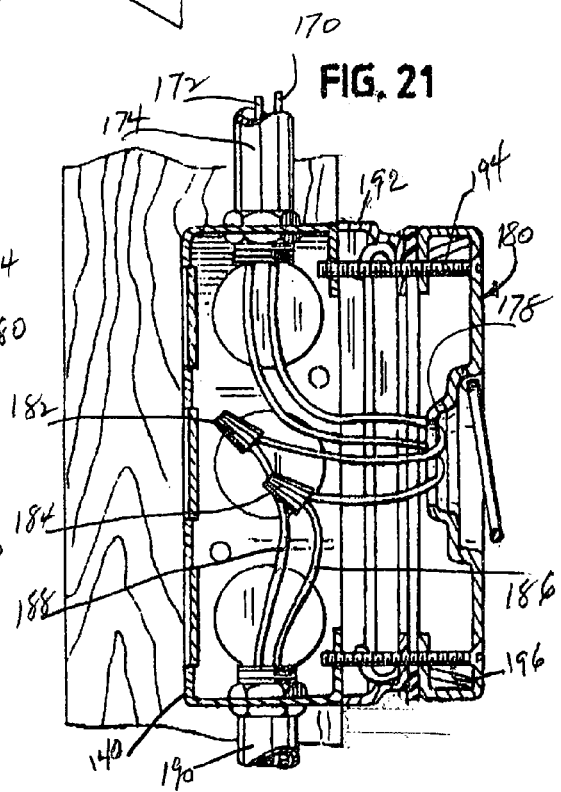
FIG. 21 is a sectional view of the assembly shown in FIG. 20, taken along the line 21—21 in FIG. 20.

Oftentimes, too, when the wires are small enough to be quite supple, as the light voltage wires 128 are in FIGS. 17 and 18, they may be tied themselves to the engagement portion 130 of a hitch 132. Or they may be looped around a hitch portion on a plaster ring cover plate and connected to a succeeding wiring segment with a tying, twist connector as shown in FIGS. 19 and 21.

In the form of cable-to-plate connection illustrated in FIGS. 6, 7, and 8, the plastic tie 126 is passed around the wire or cable end 124, through aperture 122, and around the engagement portion 120 of the hitch 118. Using a plastic tie in this form of connection exposes a segment of the plastic tie in aperture 122 from the front side 54 of the plaster ring cover plate and permits an electrician or other installer to quickly snip the plastic tie 126 with his wire clippers. In this manner a quick disconnection is accomplished which disengages the cover plate from the wire or cable end after the installer has pulled the wire or cable end out of the wall with the cover plate (See FIG. 7).

In prior art installations, as illustrated in FIGS. 4 and 5, the early stages of constructing a wall entailed bringing a wire or cable end 134 to a point inside the wall, usually near a stud 136, adjacent to a place where a plaster ring 138 had been affixed to the stud. Sometimes the wires were brought into a junction box 140, as illustrated in FIGS. 19 and 21. When surface members, usually wallboards 142, were fastened to the studs, openings 144 had to be created around the raised plaster ring portions 146 in order to bring the wallboards flush against the studs. The openings 144 were also necessary to permit access through the plaster rings to the wire and cable ends inside the wall. But making the openings 144 fit around the raised plaster ring portions 146 exactly and without leaving a seam was impossible. Moreover, when an opening 144 had to be made in the vicinity of a junction box into which wires had already been pulled, the wires were often damaged by a wallboard installer's knife or saw.

Protective knock-out plates were sometimes used in the central apertures of the plaster rings, attached to and suspended on the raised plaster ring portions 146 as above described. The wallboard openings 144 around the plaster rings were usually filled with joint cement 148 up to the edges of the raised portions 146. The cement was difficult to control. When protective plates were used, the joint cement often sealed the edges of the plates to the plaster rings. When protective plates were not used in the central openings of the plaster rings, joint cement often spilled inside the plaster rings, sometimes coating the wire ends and, in any event, making it difficult for a fixture installer to fish through a plaster ring and pull the wire ends out in order to connect a fixture.

As described above, the present invention makes withdrawal of the wire and cable ends rapid and easy for an electrical fixture installer. Instead of leaving a wire or cable end inside a wall as it is being constructed somewhere in the vicinity of the place where a fixture is to be installed when the wall is finished and painted, as the wire or cable end 134 is in FIGS. 4 and 5, the present invention is utilized by drawing a wire or cable end 124 out of the wall through the central aperture 150 of a plaster ring and attaching that end 124 to a hitch such as the hitch 118. Thereafter the plaster ring cover plate 10 bearing hitch 118 with the wire or cable end 124 attached, is temporarily and removably engaged on the edge portions of a plaster ring.

A preferable manner of temporarily attaching the plaster ring cover plate to a plaster ring is illustrated in FIGS. 8–10. The distal ends 46 and 48 of spring arms 38 and 40 are hooked over edge portions such as edge 50 of the plaster ring, and then the distal ends 30 and 32 of spring arms 22 and 24 are clipped onto edge portions such as edged 34 of the plaster ring. In FIG. 9A, the directional arrow 152 indicates the movement toward edge 34 which arm 22 takes during engagement of arm 22 on edge 34, and directional arrow 154 indicates the movement of arm 22 during engagement to accommodate passage of arm 22 onto edge 34. FIG. 9B illustrates the engaged position of arm 22 on edge 34. Beginning with the position of the plaster ring cover plate shown in phantom in FIG. 8, movement of the cover plate in the direction of arrow 156 brings the spring arms 38 and 40, and also spring arms 22 and 24, into their engagements on the edges of the plaster ring shown in FIGS. 8, 9A, 9B and 10.

Removal of cover plate 10 from plaster ring 36 is accomplished, as shown in FIG. 7, by grasping the bail 56 on the plaster ring cover plate 10 and pulling it away from the plaster ring 36 in the direction indicated by arrow 158. As the plate 10 is pulled away from the plaster ring, tie 126 attached to the hitch 118 pulls the wire or cable end 124 through central aperture 150 in the plaster ring and out of the wall. There a fixture installer can quickly disengage the plate 10 from the wire or cable end 124, as by clipping tie 126, and then affix end 124 to the electrical fixture intended for that location.

One form of such an electrical fixture is illustrated in FIGS. 14–16. An installation plate 160 contains a cable connecting socket 162. A cable connector 164, having a plurality of electrical conductor receiving members 166, includes an installation plate connector block 168 which snaps into engagement with the edges of socket 162. A fixture installer preparing to use the end of a cable withdrawn from inside a wall at the location where the installation plate 160 is intended to go can quickly and easily disconnect a plaster ring cover plate from the cable end as above described, connect the ends of the conductor wires inside the cable to the connector 164, snap the block 168 into place in the socket 162 and affix the installation plate, with the connection completed, onto the room side of the wall. No time is wasted looking for a cable end within the wall or uncovering a cable from a hardened mass of joint compound.

Figure 20:
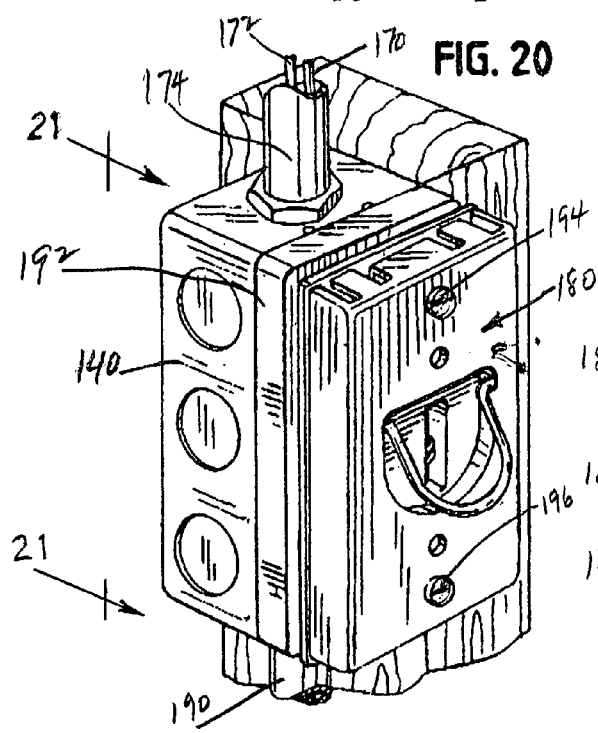
FIG. 20 is a perspective view of the assembly shown in FIG. 19.

In the application shown in FIGS. 19–21, low voltage wires 170 and 172 may be pulled through a conduit 174 into junction box 140, and, instead of being tied in a knot 176 around hitch 132 as shown in FIGS. 17 and 18, they may be looped through a hitch 178 on plaster ring cover plate 180, as shown in FIGS. 19 and 21, and joined with twist connectors 182 and 184 to a further pair of low voltage wires 186 and 188 which have been pulled into the junction box 140 through conduit 190. When the wires 172, 174 have been connected to wires 186, 188 in this manner, as shown in FIG. 19, the plaster ring 192 and the plaster ring cover plate 180 on which the wires are engaged are assembled on the junction box 140 as shown in FIG. 20. The connected wires are stuffed inside the junction box as shown in FIG. 21.

Screws 194 and 196 may be used to hold the entire assembly together, as shown in FIGS. 19–21, or may only be used to hold the plaster ring onto the junction box (not shown). In either assembly, the plaster ring cover plate 180 is temporarily and removably engaged on the plaster ring, as above described, so that a fixture installer can remove the cover plate quickly and pull the wires from the junction box as he draws the cover plate away from the plaster ring.

When various electrical systems are to be installed in a building, it is very helpful to a fixture installer to know which locations match the various systems without having to refer to a series of diagrams. For example, the plaster rings 36 on the studs 136 in FIG. 11 may or may not support the same voltage system. Further, when there are various locations to install fixtures in a room, or a series of rooms, it is helpful and time saving to see all of the locations quickly. Accordingly, the plaster ring cover plate 10 may be provided with an adhesively mounted label 64 printed in an eye-catching color to facilitate finding a particular fixture location. The colors can be varied, to match the number of systems being installed, i.e., computer locations, high and low voltage lighting, appliances and the like. FIG. 13 illustrates a variety of labels in colors, 64A, 64B and 64C. Still other information can be conveyed about the fixture installations by way of directions printed on the labels.

It is evident from the preceding disclosure that even though particular forms of the invention have been illustrated and described, still, various modifications can be made without departing from the true spirit and scope of the invention. No limitations on the invention are intended, and its true scope is set forth in the following claims.

I claim:

1. An electrical conductor retrieval assembly for finding and withdrawing wire and cable ends from places where they have been brought temporarily inside a wall construction comprising:
   a wall stud,
   a plaster ring fastened to the stud having opposed edge portions defining an opening through the ring from inside the wall,
   a plaster ring cover plate,
   spring biased arms on the plaster ring cover plate engaging the edge portions of the plaster ring and holding the plaster ring cover plate clipped onto the plaster ring, and
   a hitch on the plaster ring cover plate forming a connection for joining the wire or cable end to the plate.

2. The retrieval assembly of claim 1 in which a plate removal member is disposed on the plaster ring cover plate for disengaging the cover plate from the plaster ring in a direction away from the wall.

3. The retrieval assembly of claim 2 in which the removal member is a bail.

4. The retrieval assembly of claim 1 in which a tying member holds the wire or cable end to the hitch.

5. The retrieval assembly of claim 4 in which the plaster ring cover plate includes a rear face disposed toward the interior of the wall and a front face disposed away from the wall, and the hitch extends from the rear face of the plate toward the interior of the wall.

6. The retrieval assembly of claim 1 which includes a label receiving surface portion facing outwardly from the wall and a label disposed on the label receiving portion.

7. The retrieval assembly of claim 6 which includes a color coded label adhesively affixed on the label receiving portion of the plaster ring cover plate.

8. The retrieval assembly of claim 1 in which the plaster ring is fastened to an electrical junction box on the stud.

9. The retrieval assembly of claim 1 in which the plaster ring cover plate includes riser edge portions and a planar member joining at least two of the riser edge portions.

10. A plaster ring cover plate comprising:
    a planar member,
    spring biased arms on the planar member extending outwardly therefrom and arranged to engage and grasp a plaster ring in a wall construction; and
    a hitch on the planar member having a wire or cable engagement portion connectable to the end of an electrical wire or cable in a wall construction for holding that end adjacent to the planar member.

11. The plaster ring cover plate of claim 10 in which a removal member is disposed upon the planar member for disengaging the cover plate from the plaster ring.

12. The plaster ring cover plate of claim 11 in which the removal member is a bail.

13. The plaster ring cover plate of claim 10 in which the planar member has a rear face arranged to confront the interior of a wall construction and a front face arranged to face away from the wall construction, the hitch extending from the rear face of the planar member toward the interior of the wall construction.

14. The plaster ring cover plate of claim 13 in which the planar member includes an aperture extending from the rear face to the front face of the planar member and exposing a wire or cable connecting portion of the hitch on the front face of the planar member.

15. The plaster ring cover plate of claim 10 in which the planar member includes a label receiving surface portion facing away from the interior of the wall construction and a label disposed on the label receiving surface portion.

16. The plaster ring cover plate of claim 15 which includes a color coded label adhesively affixed on the label receiving surface portion.

17. The plaster ring cover plate of claim 10 which includes riser edge portions and a planar member joining at least two of the riser edge portions.

18. An electrical conductor retrieval assembly for finding and withdrawing wire and cable ends from places where they have been brought temporarily inside a wall construction comprising:
    a wall stud,
    a plaster ring fastened to the stud having opposed edge portions defining an opening through the ring from inside the wall,
    a plaster ring cover plate temporarily and removably engaged on the edge portions of the plaster ring and having a rear face disposed toward the interior of the wall and a front face disposed away from the wall,
    a hitch on the plaster ring cover plate forming a connection for joining the wire or cable end to the plate and extending from the rear face of the plate toward the interior of the wall,
    a tying member holding the wire or cable end to the hitch, and
    an aperture formed in the cover plate adjacent the hitch extending from the rear face to the front face of the plate and exposing a portion of the tying member on the front face of the plate.

* * * * *